(No Model.)
A. E. MONROE.
HOOK.
No. 462,721. Patented Nov. 10, 1891.
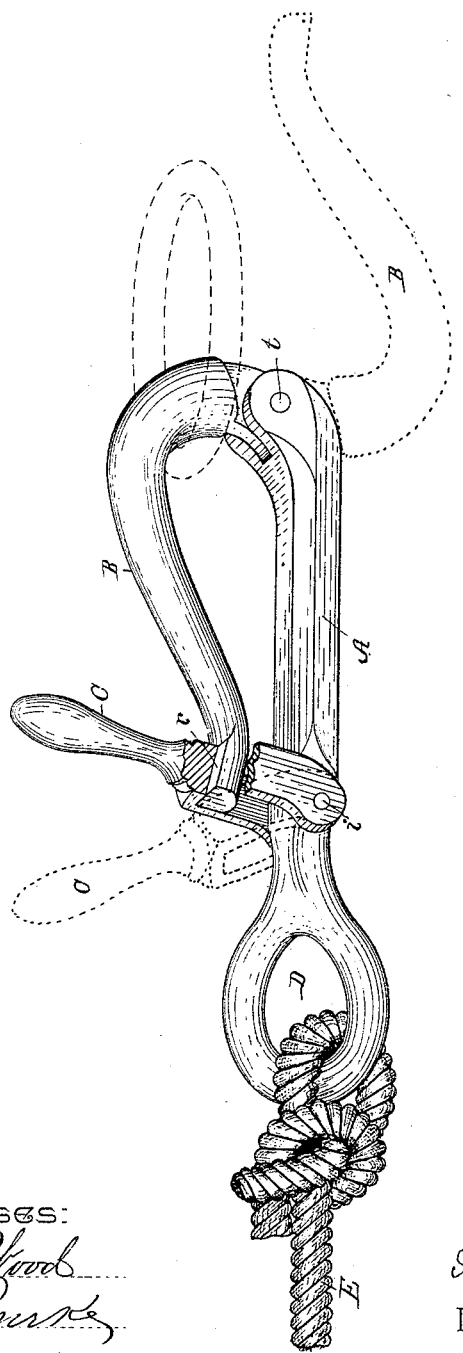
Witnesses:
Walter S. Wood
S. N. Burke
Inventor.
Adelbert E. Monroe
By Lucius C. West
Att'y.

UNITED STATES PATENT OFFICE.

ADELBERT E. MONROE, OF BARRY, MICHIGAN.

HOOK.

SPECIFICATION forming part of Letters Patent No. 462,721, dated November 10, 1891.

Application filed August 8, 1890. Serial No. 361,417. (No model.)

*To all whom it may concern:*

Be it known that I, ADELBERT E. MONROE, a citizen of the United States, residing at Barry, county of Barry, State of Michigan, have invented a new and useful Hook, of which the following is a specification.

This invention relates to that class of hooks which have a bowed hinged part to which the draft-power is attached and means for detachably holding said part, so that it can be freed at will to quickly detach the draft-power; and it has for its object a peculiar construction of the swinging part of the hook and its retaining-lever, as below described and claimed, said hook being more especially designed for use with hay-forks.

In the drawing forming a part of this specification is shown a perspective view of the hook with parts broken away. The hook consists of the bar A, having an eye D in one end, to which eye the draw-rope E is attached, said rope of course (in use) being extended over pulleys and attached to the fork in the ordinary manner. The rope is here shown broken, and the pulleys and fork are not shown. To the other end of the bar A is hinged the swinging part B of the hook at *t*. This part B curves upward from the hinge *t*, forming the part to which the whiffletree is attached. From thence it converges downward toward the bar A, and then slightly tilted upward at *r*. The upper surface of the upwardly-tilted end *r* of the swinging part B is made flat and on an incline extending upwardly and rearwardly from the tread-bar A. The forked locked lever is shown at C, the free ends of the prongs of said lever being pivoted to the draw-bar A at *i*. Between the prongs of lever C, where they join the handle, is a shoulder *e*, which shoulder engages the inclined surface of the swinging part of the hook when said part is locked, as shown in the drawing. When in this condition, the hook cannot be detached from the whiffletree; but by swinging the lock-lever C over, as in dotted position, the strain of the draft-power will quickly swing the part B forward, as in dotted position, and at once detach the whiffletree, as before stated. So easily and conveniently can this be done that a boy can operate it, for there is no necessity to slack the rope E before detaching the horse. The hook may be thus employed for any hoisting or other purpose.

Having thus described my invention, what I claim as new, and desire to secure by Letters Patent of the United States, is—

The hook comprising the draw-bar having an eye at one end for the attachment of a draw-rope, the hook portion hinged to the other end of the draw-bar at a point below the bearing for the whiffletree-ring, and a handled lever pivoted to the shank of the draw-bar for detachably engaging the free end of the hinged part of the hook, substantially as set forth.

In testimony of the foregoing I have hereunto subscribed my name in presence of two witnesses.

ADELBERT E. MONROE.

Witnesses:
   M. D. JENKINS,
   E. L. SANDERS.